Patented Mar. 14, 1944

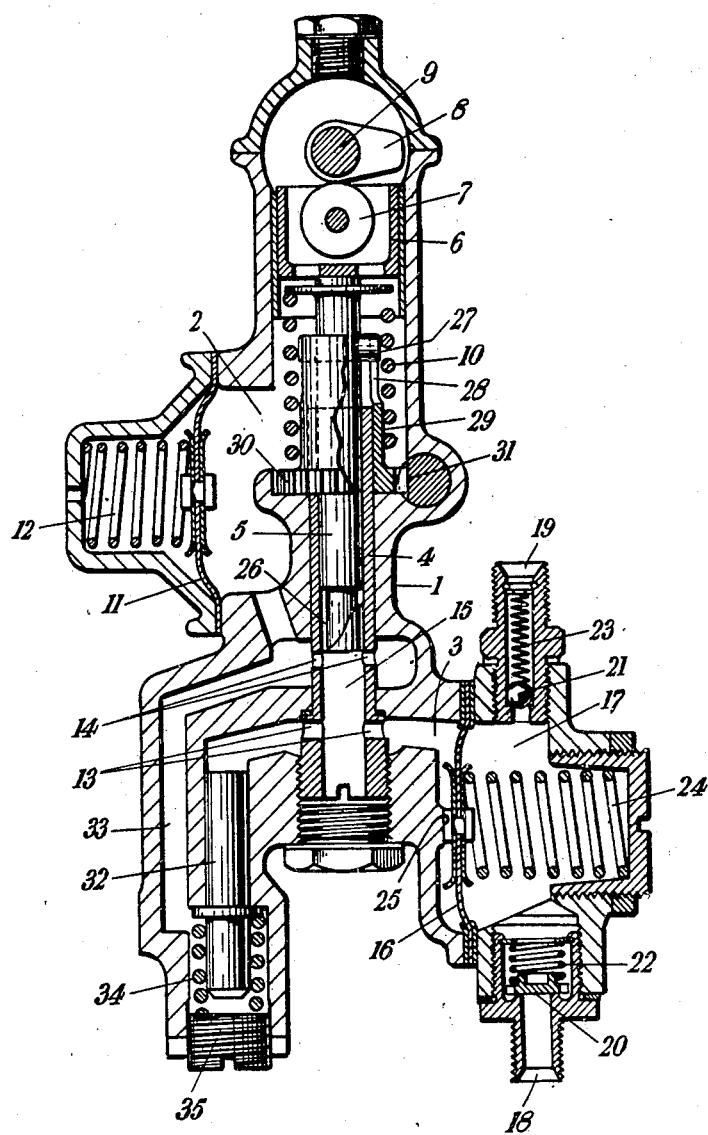

2,343,962

UNITED STATES PATENT OFFICE 2,343,962

MEASURING PUMP

Edward Dodson, Somerset, England

Application January 17, 1942, Serial No. 427,125
In Great Britain February 25, 1941

7 Claims. (Cl. 103—44)

This invention relates to pumps for delivering measured quantities of liquid and has particular but not exclusive reference to fuel injection pumps for delivering a measured quantity of fuel to the cylinder of an internal combustion engine.

It is not practicable to use a directly actuated diaphragm pump for this purpose, because the injection pressure used is very high and the diaphragm would be unable to stand up to this pressure if subjected to it on one side only. Also it would be extremely difficult to arrange for sufficiently accurate variation in the stroke of such a pump.

Variable stroke plunger pumps are known, but the tendency of the fuel to slip past the plunger renders such a pump incapable of delivering accurately measured quantities of fuel. Also it is difficult to keep the plunger and its operating mechanism properly lubricated.

The invention provides a pump for delivering accurately measured quantities of liquid, comprising a diaphragm, bellows, capsule, or the equivalent exposed at one side to the liquid to be delivered and at the other side to a viscous liquid such as oil, and a reciprocating plunger arranged to produce pulsations in the viscous liquid and thereby to actuate the diaphragm to pump the liquid in accurately measured quantities, corresponding, on each stroke, to the quantity of viscous liquid displaced by the plunger.

The invention also provides a pump for delivering accurately measured quantities of liquid, comprising a sealed chamber to contain a viscous liquid such as oil, a plunger and means for reciprocating the same to deliver the viscous liquid from the sealed chamber to an intermediate chamber, a pump chamber to contain the liquid to be pumped, and a diaphragm, bellows, capsule or the equivalent constituting an elastic wall common to the intermediate and pump chambers.

With such a pump, the oil not only serves to lubricate the plunger but also, being a viscous liquid, minimises errors in measurement due to slip past the plunger. Moreover the oil pressure supports the diaphragm against the high pressure of the fuel or other liquid to be delivered.

Preferably the pump includes means for varying the effective stroke of the plunger for the purpose of altering the quantity of fluid pumped by the diaphragm or the equivalent at each stroke.

One embodiment of the invention, as applied to a fuel injection pump, will now be described in greater detail, by way of example, with reference to the accompanying drawing which is a vertical section through the pump, showing the plunger at the end of its suction stroke.

The pump consists of a casing 1, within which is formed a pair of sealed chambers 2 and 3. The upper sealed chamber 2 is filled with oil. In a bore extending vertically through the casing is fixed a barrel 4 containing a reciprocating plunger 5. On top of the plunger is supported a cup 6 in which is journalled a roller 7, constituting a tappet which cooperates with a cam 8 on an operating shaft 9 to give the plunger its reciprocating movement, a stout spring 10 holding the tappet firmly against the cam. The cam 8 is located in the upper portion of the sealed chamber 2 so that the oil contained in this chamber serves to lubricate the plunger 5 and its operating gear. The sealed chamber 2 has an elastic wall constituted by a diaphragm 11, loaded by a spring 12, which maintains the oil under some pressure and compensates for any loss by slight leakage via the operating mechanism.

The barrel 4 is formed with two sets of ports. The lower set 13 near the bottom of the barrel are in permanent communication with the sealed chamber 3 and serve as outlet ports. The upper set 14, which are controlled by the plunger 5, serve, when unmasked at the end of the suction stroke of the plunger, to place the interior 15 of the barrel into communication with the sealed chamber 2 and so act as inlet ports. The plunger therefore, at each stroke, delivers a definite quantity of oil from the sealed chamber 2, via the barrel, to the sealed chamber 3.

One wall of the sealed chamber 3 is constituted by a diaphragm 16 which is preferably made of synthetic rubber, and which is exposed on its outer side to the pressure of the petrol to be delivered by the pump. If desired this diaphragm could be replaced by a bellows, capsule or the equivalent. The petrol is located in a third chamber 17 having an inlet 18 and an outlet 19, which are respectively controlled by non-return valves 20, 21 associated with springs 22, 23. The pressure in the pump chamber 17, which may in some cases be assisted by a spring 24, as illustrated, exceeds that exerted by the elastic wall 11 of the sealed chamber 2 and holds the diaphragm 16 against a stop 25 at the end of the suction stroke of the plunger.

The diaphragm 16 is therefore caused by the pulsations in hydraulic pressure produced by the plunger 5 to exercise a pumping action on the petrol, the quantity of petrol displaced through the outlet 19 being equal to the quantity of oil forced into the intermediate chamber 3 on the delivery stroke of the plunger, whatever shape the diaphragm may assume. As the plunger moves in oil, very close fits between the plunger and barrel are unnecessary, because the danger of errors due to slip past the plunger is very much less than it would be were the plunger to act directly on the petrol. This, of course, greatly facilitates manufacture.

The effective stroke of the plunger 5 is adjustable. This adjustment is effected by controlling the amount of spill back to the inlet ports 14 at the upper end of the barrel allowed on the pumping stroke. The head of the plunger is grooved obliquely to form a release passage 26 for oil to spill back to the inlet ports 14. If therefore the plunger is rotated relatively to the barrel, as described below, the quantity of oil it will deliver on each stroke, and consequently the quantity of fuel delivered by the diaphragm, can be varied. The plunger is formed near its upper end with a pair of transversely projecting lugs 27 engaging in vertical slots (one of which is indicated at 28) in a sleeve 29 which is rotatably mounted on the exterior of the upper portion of the barrel 4. At its lower end the sleeve is formed with gear teeth 30 engaging a rack 31. Longitudinal adjustment of the rack 31 will therefore rotate the sleeve 29 and plunger 5 and so vary the measured quantity of fuel delivered per stroke of the pump.

To compensate for slight variations in manufacture, a small piston 32 is provided in the sealed chamber 3, the outer end of the piston being exposed to the pressure prevailing in a passage 33 connected to the sealed chamber 2 and a spring 34 being provided for supporting the piston 32 against the hydraulic pressure in the chamber 3. The spring 34 abuts at its other end against a nut 35 for adjusting the pressure of the spring and so effecting the desired compensation.

What I claim as my invention and desire to secure by Letters Patent is:

1. A pump, comprising a casing containing three chambers, namely a sealed chamber to contain a viscous liquid, said sealed chamber having an elastic wall for exerting inwardly directed pressure on the contained liquid, an intermediate sealed chamber, and a pump chamber to contain the liquid to be pumped, a flow passage for enabling flow of said viscous liquid between said sealed chambers, a plunger mounted to reciprocate in the casing and disposed in position to receive said viscous liquid whereby said plunger is lubricated by said viscous liquid, operating gear for reciprocating the plunger to deliver at each stroke a quantity of the viscous liquid from the sealed chamber to the intermediate chamber, valves controlling the inlet and outlet of the pump chamber, an elastic pumping member constituting a wall common to the intermediate chamber and the pump chamber, and operating under the control of the liquid pressure in the intermediate chamber, and means for predetermining the extent of pumping movement of said elastic pumping member to deliver accurately measured quantities of liquid from the pump chamber.

2. A pump, comprising a casing containing three chambers, namely a sealed chamber to contain a viscous liquid, said sealed chamber having an elastic wall spring-loaded to exert pressure on the contained liquid, an intermediate sealed chamber, and a pump chamber to contain the liquid to be pumped, a flow passage for enabling flow of said viscous liquid between said sealed chambers, a plunger mounted to reciprocate in the casing, operating gear for reciprocating the plunger to deliver at each stroke a quantity of the viscous liquid from the sealed chamber to the intermediate chamber, valves controlling the inlet and outlet of the pump chamber, a pumping diaphragm constituting a wall common to the intermediate chamber and the pump chamber, and operating under the control of the liquid pressure in the intermediate chamber, and means for predetermining the extent of pumping movement of said diaphragm to deliver accurately measured quantities of liquid from the pump chamber.

3. A pump, comprising a casing containing three chambers, namely a sealed chamber to contain a viscous liquid, an intermediate sealed chamber, and a pump chamber to contain the liquid to be pumped, a flow passage for enabling flow of said viscous liquid between said sealed chambers, a plunger mounted to reciprocate in the casing, operating gear for reciprocating the plunger to deliver at each stroke a quantity of the viscous liquid from the sealed chamber to the intermediate chamber, means for maintaining the liquid in the sealed chamber under pressure, means for varying the effective stroke of the plunger, valves controlling the inlet and outlet of the pump chamber, an elastic pumping member constituting a wall common to the intermediate chamber and the pump chamber, and operating under the control of the liquid pressure in the intermediate chamber, and means for predetermining the extent of pumping movement of said elastic pumping member to deliver accurately measured quantities of liquid from the pump chamber.

4. A pump as claimed in claim 1, in which the intermediate chamber contains, for the purpose specified, a supplementary piston, exposed at its outer end to an adjustable spring pressure and also to the pressure in the sealed chamber.

5. A pump, comprising a casing containing three chambers, namely a sealed chamber to contain a viscous liquid, said sealed chamber having an elastic wall spring loaded to exert pressure on the contained liquid, an intermediate sealed chamber, and a pump chamber to contain the liquid to be pumped, a barrel located in the casing with its upper end open to the sealed chamber and its lower end open to the intermediate chamber, the barrel being formed intermediately with a port communicating with the sealed chamber, a plunger mounted to reciprocate in the barrel to pump into the intermediate chamber viscous liquid admitted to the barrel through said port, driving means for reciprocating said plunger as aforesaid, valves controlling the inlet and outlet of the pump chamber, an elastic pumping member constituting a wall common to the intermediate chamber and the pump chamber, and operating under the control of the liquid pressure in the intermediate chamber, and means for predetermining the extent of pumping movement of said elastic pumping member to deliver accurately measured quantities of liquid from the pump chamber.

6. A pump, comprising a casing containing three chambers, namely a sealed chamber to contain a viscous liquid, said sealed chamber having an elastic wall for exerting inwardly directed pressure on the contained liquid, an intermediate sealed chamber, and a pump chamber to contain the liquid to be pumped, a flow passage for enabling flow of said viscous liquid between said sealed chambers, a plunger mounted to reciprocate in the casing, operating gear for reciprocating the plunger to deliver at each stroke a quantity of the viscous liquid from the sealed chamber to the intermediate chamber, valves controlling the inlet and outlet of the pump chamber, an elastic member constituting a wall common to the intermediate chamber and the pump chamber, and operating under the control of the liquid pressure in the intermediate chamber, to deliver accurately measured quantities of liquid from the pump chamber and a stop for arresting the movement of the elastic wall on the suction stroke of the plunger and holding said wall against the pressure of the liquid in the pump chamber.

7. A pump, comprising a casing containing three chambers, namely a sealed chamber to contain a viscous liquid and having an elastic wall for exerting inwardly directed pressure on the contained liquid, an intermediate sealed chamber, and a pump chamber to contain the liquid to be pumped, a flow passage for enabling flow of said viscous liquid between said sealed chambers, a plunger mounted to reciprocate in the casing and disposed in position to contact said viscous liquid, whereby said plunger is lubricated by said liquid, means for reciprocating the plunger to deliver at each stroke a quantity of the viscous liquid from the first-mentioned sealed chamber to the intermediate chamber, valves controlling the inlet and outlet of the pump chamber, and an elastic member constituting a wall common to the intermediate chamber and the pump chamber, and operating under the control of the liquid pressure in the intermediate chamber for pumping liquid from said pump chamber.

EDWARD DODSON.